United States Patent Office 3,451,826
Patented June 24, 1969

3,451,826
METHOD OF COATING FRUITS AND VEGETABLES WITH A THIN FILM OF LECITHIN AND METHOD OF MAKING LECITHIN EMULSION FOR SAID PURPOSE
Tjebbo Jakob Mulder, Amsterdam-Buitenveldert, Netherlands, assignor to Lecifruit N.V., Amsterdam-Buitenveldert, Netherlands
No Drawing. Filed Nov. 15, 1965, Ser. No. 507,658
Claims priority, application Netherlands, Nov. 16, 1964, 6413312
Int. Cl. A23b 7/16
U.S. Cl. 99—168                7 Claims

ABSTRACT OF THE DISCLOSURE

A lecithin emulsion for coating fruits and vegetables is prepared by separating the phosphatides in commercial lecithin by treatment with an organic solvent, hydrolyzing the phosphatides in said solvent with an alkali, whereafter the pH value is adjusted to 6.9–7.4 with acid. The emulsion so prepared may be well diluted down and still give good even and complete cover when applied to fruits and vegetables.

---

The invention relates to a method of coating fruit, vegetables and similar vegetable products with a thin film of lecithin and also relates to a method of making the lecithin emulsion to be used for the purpose.

In order to promote the keeping quality of vegetable products, the applicant proposed that the products be provided with a thin film or skin of lecithin by means of a lecithin emulsion.

More particularly, in connection with the combating of spot and scald (forming of spots and brown discolouration of the skin) on apples, tests were performed on the basis of the above-mentioned proposals and were published in the Annual Report of the Institut voor Bewaring en Verwerking van Tuinbouwprodukten (Institute for the Preservation and Processing of Horticultural Produce) at Wageningen, 1961, pp. 45–48 and 73, and in subsequent publications. From the said tests it appears that favorable results can be obtained with lecithin, which is harmless. In these tests, which were performed both with picked apples and with apples on the tree, a 1–2% lecithin emulsion in an aqueous alcohol solution was used.

The method according to the invention aims at improving the said known method which, in addition to being applicable to picked apples, can also be applied to other picked fruits and vegetables, possibly in the cut condition, and also to vegetable products which have not yet been picked or harvested.

Further tests showed that more particularly the nature of the lecithin film applied to the products is of especial influence upon the effect. Proceeding according to the invention, better and more complete covering of the products to be treated can be obtained.

In applying the invention, vegetable lecithin is preferably used, which is relatively cheap.

According to the invention, the products are treated with a lecithin emulsion in which the phosphatides, after being dissolved in an organic solvent, have been hydrolysed for a short time by treatment with an alkali, whereafter the pH value has been adjusted to 6.9–7.4 by the addition of acid.

$NH_4OH$ is preferably used as the alkali.

As appears from the following, very completely closed and well adhering coatings can be applied by means of such emulsions.

The invention also relates to a method of making a lecithin emulsion which is suitable for the treatment of vegetable products. The first important requirement, which is indeed fulfilled by the method according to the invention, is that with an emulsion containing only a relatively small quantity of lecithin (e.g., up to a few percent) an efficient covering and sealing layer of lecithin can nevertheless be applied to the products to be treated.

Another important practical requirement is that an emulsion can be made available to users in a fairly concentrated form, which emulsion can, while retaining good dispersion and other desired properties, be diluted before use, so that freight and transport charges are thereby saved.

To this end, in practice, an initial emulsion preferably containing about 20% of lecithin is prepared, which can be diluted to the actual working emulsion by dilution in the ratio of about 1:10 at room temperature.

In the preparation of the lecithin emulsion according to the invention, the phosphatides in commercial lecithin are substantially separated—by treatment with an organic solvent—in a separate layer from the other components, and at least these phosphatides are subjected for a short time to hydrolysis with an alkali, whereafter the pH value is adjusted to 6.9–7.4 with acid.

Hydrolysis can be performed in such a manner that only the layer containing the phosphatides is hydrolysed. However, the alkali used for hydrolysis can also be added to the system comprising two layers, the whole of which can be processed into the lecithin emulsion.

An alcohol is preferably used as the solvent, more particularly 96% ethyl alcohol. Other volatile non-toxic solvents, such as other alcohols, etc., can also be used.

For example, a quantity of 2 kg. of commercial lecithin, which in general contains about 65% phosphatides and 35% neutral lipoids, is heated for, say, 10 minutes on a water bath of 50° C. and is stirred with about the same quantity of 96% ethyl alcohol. Two layers are formed, the lower of which contains chiefly the phosphatides and the upper contains the free fatty acids and the lipoids. To the accompaniment of stirring about 2 litres of approximately normal ammonium hydroxide is added to this system. In this way a thick homogeneous solution is obtained which, after a few minutes, is adjusted to a pH value of 6.9–7.4 by means of a normal solution of hydrochloric acid. After a small quantity of water has been added, a very stable, nonsettling emulsion is obtained which can be kept for weeks and which, on being diluted with water or with an alcohol diluted with water, can quickly and even without stirring give a 1–3% lecithin emulsion at room temperature.

The following test shows that more particularly the brief hydrolysis of the phosphatides, which are present in the bottom layer as a result of treatment with the organic solvent, which hydrolysis can also be performed at room temperature, of a particular importance.

If only the upper layer is hydrolysed with ammonium hydroxide in the manner described and is then mixed with a mixture of lecithin and organic solvent, only an unstable, rapidly settling emulsion is formed. However, if the same procedure is applied to the hydrolysed bottom layer, then a stable and suitably fluid emulsion is indeed obtained. Since the bottom layer chiefly contains the phosphatides liberated by the solvent, this indicates that it is particularly the hydrolysis of the phosphatides that promotes the stability of the lecithin emulsion.

Also, if not enough organic solvent, such as alcohol, is added to the lecithin to cause the said two layers to form, then it is not possible to obtain the desired stable, suitably dilutable lecithin emulsion.

It is therefore essential to the invention that, in the eventual lecithin emulsion, a phosphatide is present which, after separation and liberation by means of the organic solvent, has been hydrolysed for a short time. Hence only the above mentioned bottom layer could be used for the purpose.

The said adjustment of the pH value is also important. The iso-electric point of lecithin is 6.7. If the pH value is higher, then the molecule is negatively charged and is affected by the so-called counter-ion (ion of opposite charge) introduced by the alkali. The pH cannot be given too high a value, because then the saponification or the hydrolysis would continue in the emulsion. At the pH value actuated above the iso-electric point of the lecithin, the lecithin molecules still act in a buffering capacity, which is advantageous to the stability of the emulsion.

For various reasons the use of ammonium hydroxide is preferable to that of other alkalies which also give positive counter-ions.

Tests have shown that the various undermentioned alkalies can be used in descending order of suitability:

| | A. |
|---|---|
| $NH_4OH$ | 1.71 |
| $CaOH$ | 1.69 |
| $KOH$ | 1.33 |
| $NaOH$ | 0.95 |
| $LiOH$ | 0.60 |

Alkalies with positive ions having the largest radius are therefore most suitable for performing the method according to the invention. Emulsions made with ammonium hydroxide give very stable emulsions with great covering power, which emulsions can be transformed by further dilution into emulsions with less—but still quite serviceable—covering power. Also, the ammonium ion is the least aggressive, and in hydrolysis it leaves the polar group of the phosphilipoid better intact, which is advantageous to emulsification and stability. Besides, a proportionally smaller amount of ammonium ion can be added, this being more economical and also less likely to affect the flavor.

If the emulsion obtained after hydrolysis is too slimy, it can be diluted with solvent, more particularly with alcohol. In the final dilution for obtaining a 1–3% lecithin emulsion, water alone or an alcohol diluted with water can be used.

The fluidity of the 20% lecithin emulsion is found to be dependent upon the quantity of alkali added for hydrolysis and upon the nature (and therefore upon the size) of the so-called counter-ion of the alkali used.

The development of sliminess in the 20% emulsion is found not to be due to continued hydrolysis. When the hydrolysis period was increased from 5 minutes to 20 minutes with $NH_4OH$ and $KOH$, the emulsion remained suitably fluid, whereas with $NaOH$ a thick slimy emulsion was formed after 5 minutes.

The following emulsions were prepared, for example, with various alkalies and in various quantities from lecithin emulsions which had all been hydrolysed in the same manner and for the same length of time and which, starting from the same commercial lecithin (20 grams), has been treated with 20 cc. of 96% ethyl alcohol and 20 cc. of distilled water and had been adjusted to a pH value of 7.2 by means of a normal solution of HCl:

E1 with 20 cc. of 0.46 normal $NH_4OH$: suitably fluid emulsion
E2 with 8 cc. 0.46 normal $NH_4OH$: suitably fluid emulsion
E3 with 2 cc. 0.46 normal $NH_4OH$: slimy emulsion
E4 with 10 cc. 0.46 normal $KOH$: slimy emulsion
E5 with 20 cc. 0.46 normal $KOH$: suitably fluid emulsion
E6 with 20 cc. 0.46 normal $NaOH$: thick slimy emulsion
E7 without addition of alkali: slimy emulsion
E8 without alkali, with 1 cc. of emulsifying agent 60–B: thick slimy emulsion.

The emulsions E1–E8 were, after dilution with 9 parts of tap water or with an alcohol water mixture, still stable at the end of 14 days, emulsification being characterized by the following features:

E1 gives rapid emulsification on dilution
E2 gives rapid emulsification on dilution
E3 gives a good emulsion after shaking
E4 gives a good emulsion after vigorous shaking
E5 gives a good emulsion after brief shaking
E6 gives a good emulsion after brief shaking
E7 gives a good emulsion after brief shaking
E8 gives a good emulsion after vigorous shaking.

The slimy emulsions therefore produce emulsions less readily on dilution with water than the suitably fluid initial emulsions do.

The covering capacity of the various emulsions was investigated in various ways.

A. Thoroughly cleaned small glass plates (microscope slides) serving as hydrophilic surfaces were immersed for 15 seconds in an at least 15 minutes old 20% lecithin emulsion and then dried in contact with the air. The tests were performed in triplicate and the results were judged by two persons independently. The over-all result of the observations was as follows:

| Emulsion | Coating thickness | Cover |
|---|---|---|
| E1 | Thick | Complete cover with coarse irregularities. |
| E2 | do | Complete cover with irregularities. |
| E3 | Thin | Complete cover with smooth fine texture. |
| E4 | Moderately thick | Do. |
| E5 | Thick | Complete cover with coarse irregularities. |
| E6 | Moderately thick | Complete cover with smooth fine texture. |
| E7 | Thin | Incomplete cover with fine textural features. |
| E8 | do | Incomplete cover, smooth. |

In those cases where no alkali was used the cover was therefore incomplete. In the macroscopic examination with the aid of a magnifying glass it was found that a slimy initial emulsion results in a thin coating on glass and that a more fluid emulsion results in a thicker and heavier coating. In all cases the cover obtained was much heavier than that obtained on immersion in a 2% lecithin solution of E1 and E7 in a 30% aqueous alcohol solution.

The heavier cover obtained with the emulsions E1, E2 and E5 enables the emulsions to be diluted down even to 0.4% lecithin and yet give good cover.

B. A tomato was chosen as a hydrophobic surface. In each case, a tomato was immersed for 30 seconds in a 2% aqueous lecithin emulsion of one of the following types and then allowed to dry in contact with the air.

The following observations were made:

| Emulsion | Coating thickness | Cover |
|---|---|---|
| E1 | Thin | Complete, slightly shiny cover. |
| E2 | do | Do. |
| E6 | do | Incomplete blotchy cover. |
| E7 | | Very incomplete cover. |
| E8 | Thin | Incomplete blotchy cover. |
| E7 [1] | Very thin | Complete, very slightly shiny cover. |
| E1 [2] | Thin | Complete cover shining like a billiard ball. |

[1] In 30% alcohol.
[2] After 60 sec. immersion.

The cover obtained with 2% emulsions prepared from fluid initial emulsions is somewhat heavier than that of a 2% emulsion in 30% alcohol.

Of course, other substances, such as fungicides and/or bactericides, could be added to the emulsions according to the invention.

I claim:
1. The method of coating fruit or vegetable products with a thin film of a lecithin product, comprising the step of applying an aqueous lecithin emulsion containing an organic solvent to said products, the phosphatides of said lecithin emulsion having been dissolved in an organic solvent and then hydrolyzed by treatment with an alkali, whereafter the pH of said emulsion having been adjusted to a range of from approximately 6.9 to 7.4 by the addition of acid.

2. The method of claim 1 wherein said alkali is $NH_4OH$.

3. The method of making a lecithin emulsion adapted for use in lecithin coating of fruit or vegetable products, said method comprising the step of treating lecithin with an organic solvent to separate the phosphatides contained therein into a separate phase, treating said phase with an alkali for hydrolyzing said phosphatides, and adjusting said phase to a pH of from about 6.9 to 7.4 by the addition of an acid thereto.

4. The method of claim 3 wherein said emulsion is diluted with water prior to being applied to said fruit or vegetable products.

5. The method of claim 3 wherein said emulsion is diluted with a mixture of water and organic solvent prior to being applied to said vegetable products.

6. The method of claim 3 wherein said alkali is $NH_4OH$.

7. The method of claim 3 wherein approximately equal parts, by weight, of lecithin and ethyl alcohol are mixed at about 50° C., said phosphatide-containing phase then being treated with an equal part of a 0.46 N $NH_4OH$ solution, and after about 5 minutes said emulsion beind adjusted to a pH of from about 6.9 to 7.4 with HCl.

References Cited

UNITED STATES PATENTS

| | | | |
|---|---|---|---|
| 2,470,281 | 5/1949 | Allingham | 99—169 |
| 3,301,881 | 1/1967 | Davis | 260—403 |

LIONEL M. SHAPIRO, *Primary Examiner.*

U.S. Cl. X.R.

99—15, 166; 252—302; 260—403